(12) United States Patent
Varghese et al.

(10) Patent No.: US 10,870,074 B2
(45) Date of Patent: Dec. 22, 2020

(54) MULTI-COMPONENT HOLDING ASSEMBLY FOR MULTI-PANEL AIR FILTER

(71) Applicants: Benny Mathew Varghese, Kearney, NE (US); Levi William Dexter, Elm Creek, NE (US)

(72) Inventors: Benny Mathew Varghese, Kearney, NE (US); Levi William Dexter, Elm Creek, NE (US)

(73) Assignee: Baldwin Filters, Inc., Kearney, NE (US)

(*) Notice: Subject to any disclaimer, the term of this patent is extended or adjusted under 35 U.S.C. 154(b) by 979 days.

(21) Appl. No.: 15/211,527

(22) Filed: Jul. 15, 2016

(65) Prior Publication Data

US 2017/0014743 A1 Jan. 19, 2017

Related U.S. Application Data

(60) Provisional application No. 62/192,877, filed on Jul. 15, 2015.

(51) Int. Cl.
*B01D 46/00* (2006.01)
*B01D 46/12* (2006.01)
(Continued)

(52) U.S. Cl.
CPC ....... *B01D 46/0005* (2013.01); *B01D 46/002* (2013.01); *B01D 46/125* (2013.01);
(Continued)

(58) Field of Classification Search
None
See application file for complete search history.

(56) References Cited

U.S. PATENT DOCUMENTS

| 2,626,010 A | 1/1953 | Sebok |
| 4,207,085 A | 6/1980 | Clifton |

(Continued)

FOREIGN PATENT DOCUMENTS

| CN | 201193576 Y | 2/2009 |
| CN | 101424233 A | 5/2009 |

(Continued)

*Primary Examiner* — Christopher P Jones
*Assistant Examiner* — Brit E. Anbacht
(74) *Attorney, Agent, or Firm* — Reinhart Boerner Van Deuren P.C.

(57) ABSTRACT

A filter element and multi-component holding assembly for a filter element is provided. The filter element includes first and second media panels, a support frame, a base frame and first and second end cap structures. Each filter media panel defines first, second, third and fourth sides. The first and second sides extend between the third and fourth sides. The support frame maintains the first and second filter media panels in a spaced orientation forming a cavity therebetween. The base frame defines a first opening in fluid communication with the cavity. The first end cap structure seals the third side of the first and second filter media panels and the second end cap structure seals the fourth side of the first and second filter media panels. The base frame has a first portion captured in the first end cap structure and a second portion captured in the second end cap structure.

45 Claims, 14 Drawing Sheets

(51) Int. Cl.
*B01D 46/52* (2006.01)
*B01D 46/42* (2006.01)

(52) U.S. Cl.
CPC ....... *B01D 46/4227* (2013.01); *B01D 46/521* (2013.01); *B01D 2265/04* (2013.01); *B01D 2271/02* (2013.01)

(56) References Cited

U.S. PATENT DOCUMENTS

| | | | |
|---|---|---|---|
| 4,440,555 | A | 4/1984 | Chichester |
| 4,882,055 | A | 11/1989 | Stamstad |
| 5,474,337 | A | 12/1995 | Nepsund et al. |
| 5,512,074 | A * | 4/1996 | Hanni ................ B01D 46/0005 55/484 |
| 5,569,311 | A | 10/1996 | Oda et al. |
| 6,375,700 | B1 | 4/2002 | Jaroszczyk et al. |
| 6,447,566 | B1 | 9/2002 | Rivera et al. |
| 6,482,247 | B2 | 11/2002 | Jaroszczyk et al. |
| 6,485,538 | B1 | 11/2002 | Toyoshima |
| 6,511,599 | B2 | 1/2003 | Jaroszczyk et al. |
| 6,846,342 | B2 | 1/2005 | Mertz et al. |
| 6,955,696 | B1 * | 10/2005 | Ost ................ B01D 46/0005 210/470 |
| 7,314,558 | B1 | 1/2008 | Jaroszczyk et al. |
| 7,323,105 | B1 | 1/2008 | Jaroszczyk et al. |
| 7,323,106 | B2 | 1/2008 | Jaroszczyk et al. |
| 7,540,895 | B2 | 6/2009 | Furseth et al. |
| 7,588,629 | B2 * | 9/2009 | Osborne ................ B01D 24/00 55/482 |
| 7,597,735 | B2 | 10/2009 | Terres et al. |
| 7,648,546 | B2 | 1/2010 | Haberkamp et al. |
| 7,662,216 | B1 | 2/2010 | Terres et al. |
| 7,691,165 | B1 | 4/2010 | Hammes |
| 7,740,678 | B2 | 6/2010 | Gunderson et al. |
| 7,799,108 | B2 | 9/2010 | Connor et al. |
| 7,879,125 | B2 | 2/2011 | Haberkamp et al. |
| 7,947,101 | B2 | 5/2011 | Devine et al. |
| 8,404,115 | B2 | 3/2013 | Myers et al. |
| 8,425,644 | B2 | 4/2013 | Sundvik et al. |
| 8,535,403 | B2 | 9/2013 | Patwardhan et al. |
| 8,668,756 | B2 | 3/2014 | Zon et al. |
| 8,764,870 | B2 | 7/2014 | Antony et al. |
| 8,926,725 | B2 | 1/2015 | Loken et al. |
| 9,205,359 | B2 * | 12/2015 | Kelmartin .......... B01D 46/0002 |
| 9,387,424 | B2 | 7/2016 | Antony et al. |
| 10,369,507 | B2 * | 8/2019 | Hedlund ............ B01D 46/0023 |
| 2003/0070406 | A1 * | 4/2003 | Duffy ................ B01D 29/031 55/497 |
| 2004/0074387 | A1 | 4/2004 | Jaisinghani |
| 2006/0065592 | A1 | 3/2006 | Terres et al. |
| 2007/0204579 | A1 | 9/2007 | Karlsson et al. |
| 2008/0011672 | A1 | 1/2008 | Schwartz et al. |
| 2008/0011673 | A1 | 1/2008 | Janikowski et al. |
| 2008/0040883 | A1 | 2/2008 | Beskow et al. |
| 2009/0193773 | A1 * | 8/2009 | Sundvik ............. B01D 46/125 55/478 |
| 2010/0126128 | A1 | 5/2010 | Scott, III |
| 2010/0269468 | A1 | 10/2010 | Crabtree et al. |
| 2011/0067368 | A1 * | 3/2011 | Handley ............. B01D 46/103 55/486 |
| 2011/0233133 | A1 | 9/2011 | Wacker et al. |
| 2011/0252759 | A1 * | 10/2011 | Nicholas ............ B01D 46/0005 55/497 |
| 2011/0277430 | A1 | 11/2011 | Nicholas |
| 2012/0011817 | A1 * | 1/2012 | Borkent ............. B01D 46/0023 55/419 |
| 2012/0055127 | A1 * | 3/2012 | Holzmann ......... B01D 46/0001 55/484 |
| 2012/0067013 | A1 * | 3/2012 | Antony ............... B01D 46/125 55/357 |
| 2013/0062276 | A1 | 3/2013 | Barreteau et al. |
| 2013/0167493 | A1 | 7/2013 | Gorman |
| 2014/0034565 | A1 * | 2/2014 | Loken .................. B01D 46/125 210/232 |
| 2014/0096493 | A1 | 4/2014 | Kelmartin et al. |
| 2014/0290194 | A1 | 10/2014 | Muenkel et al. |
| 2014/0305087 | A1 | 10/2014 | Antony et al. |
| 2015/0013293 | A1 | 1/2015 | Wagner et al. |
| 2015/0075125 | A1 * | 3/2015 | Porbeni ............. B01D 46/0002 55/499 |
| 2015/0202560 | A1 * | 7/2015 | Jarrier ................. B01D 46/023 55/378 |
| 2015/0224434 | A1 * | 8/2015 | Hedlund ............ B01D 46/0005 55/482 |
| 2015/0246308 | A1 | 9/2015 | Lans |
| 2015/0290573 | A1 * | 10/2015 | Hugert ............... B01D 46/0026 55/484 |
| 2016/0016100 | A1 | 1/2016 | Mouanda et al. |
| 2017/0014743 | A1 * | 1/2017 | Varghese .......... B01D 46/0005 |
| 2018/0236391 | A1 * | 8/2018 | Dexter ............... B01D 46/4227 |
| 2018/0257017 | A1 | 9/2018 | Adamek et al. |
| 2019/0299148 | A1 * | 10/2019 | Dexter ............... B01D 46/521 |

FOREIGN PATENT DOCUMENTS

| | | |
|---|---|---|
| WO | WO 2007/084709 A1 | 7/2007 |
| WO | WO 2014/040615 A1 | 3/2014 |
| WO | WO 2014/058692 A1 | 4/2014 |
| WO | WO 2017/192441 A1 | 11/2017 |

* cited by examiner

MULTI-COMPONENT HOLDING ASSEMBLY FOR MULTI-PANEL AIR FILTER

CROSS-REFERENCE TO RELATED PATENT APPLICATIONS

This patent application claims the benefit of U.S. Provisional Patent Application No. 62/192,877, filed Jul. 15, 2015, the entire teachings and disclosure of which are incorporated herein by reference thereto.

FIELD OF THE INVENTION

This invention generally relates to filters and more particularly to air filters and more particularly to air filters have panels of filter media.

BACKGROUND OF THE INVENTION

Filter elements are used to filter fluid such as air to prevent damage or reduced functionality of downstream systems. Typically, the filter elements are configured to be a replacement part such that when they become clogged or their useful life is otherwise spent, they can be replaced.

One particular type of filter element utilizes a plurality of panels of filter media operably mounted to a frame. The panels of filter media are operably sealed relative to each other on three sides to form a cavity that is open on a single side. The present invention relates to improvements over the state of the art for this type of filter element.

BRIEF SUMMARY OF THE INVENTION

In one embodiment, a filter element includes first and second media panels, a support frame, a base frame and first and second end cap structures is provided. Each filter media panel defines a first, a second, a third, and a fourth side. For each filter media panel, the first and second sides are offset from one another and extend between the third and fourth sides which are offset from one another. The support frame maintains the first and second filter media panels in a generally spaced orientation forming a cavity therebetween. The base frame defines a first opening in fluid communication with the cavity. The first end cap structure operably seals the third side of the first and second filter media panels and the second end cap structure operably seals the fourth side of the first and second filter media panels. The base frame has a first portion captured in the first end cap structure and a second portion captured in the second end cap structure.

In one embodiment, the first portion of the base frame is a first outward extending flange that is received in the first end cap structure and the second portion of the base frame is a second outward extending flange that is received in the second end cap structure. The first and second flanges are on opposite sides of the first opening and extend outward away from one another.

In one embodiment, the support frame defines first, second, third, and fourth sides with, the first and second sides offset from one another and extending between the third and fourth sides. The first side of the support frame is positioned adjacent the first sides of the first and second filter media panels. The second side of the support frame is positioned adjacent the second sides of the first and second filter media panels. The third side of the support frame is positioned adjacent the third sides of the first and second filter media panels. The fourth side of the support frame is positioned adjacent the fourth sides of the first and second filter media panels.

In one embodiment, the third side of the support frame is captured in the first end cap structure and the fourth side of the support frame is captured in the second end cap structure.

In one embodiment, the filter element includes a second side support structure adjacent the second sides of the first and second media panels and the support frame. The second side support structure extends between first and second ends. The first end is captured in the first end cap structure and the second end is captured in the second end cap structure.

In one embodiment, the first and second filter media panels are pleated media panels. At least one pleat of the first and second filter media panels is pinched between the second side of the support frame and the second side support structure.

In one embodiment, a seal material is interposed between the second side of the support frame and the second side support structure. The seal material seals the second side of the first and second filter media panels to at least one of the second side of the support frame and the second side support structure.

In one embodiment, the second side support structure includes a handle member.

In one embodiment, the second side of the support frame overlaps, at least in part, the second sides of the first and second filter media panels.

In one embodiment, a housing seal is carried by the base frame for operably sealing the filter element to a housing structure.

In one embodiment, the first and second end cap structures are each composite structures including a cupped end cap and adhesive within the cupped end cap. At least the adhesive captures the corresponding side of the support frame, portion of the base frame and sealing the corresponding sides of the first and second filter media panel.

In one embodiment, the first and second end cap structures are formed from rigid urethane. The rigid urethane captures the corresponding side of the support frame, portion of the base frame and sealing the corresponding sides of the first and second filter media panel.

In one embodiment, the first sides of the first and second filter media panels are sealingly attached to the base frame.

In one embodiment, the first side of the support frame defines a second opening in fluid communication with the cavity between the first and second filter media panels.

In one embodiment, the first, second, third, and fourth sides of the support frame bound first and second flow openings. The first flow opening being adjacent the first filter media panel and the second flow opening being adjacent the second filter media panel.

In one embodiment, the first and second filter media panels define interior faces. The interior faces of the first and second filter media panels generally facing each other.

In one embodiment, the support frame and base frame maintain the interior faces of the first and second filter media panels in a non-parallel orientation with the first sides of the first and second panels spaced part from one another at a greater distance than the second sides of the first and second panels such that the cavity is generally wedge shaped.

In one embodiment, each of the first and second portions of the base frame defines first and second tapered locating surfaces. The first side of the first filter media panel is supported on the first tapered locating surfaces and the first side of the second filter media panel supported on the second tapered locating surfaces.

In one embodiment, the first tapered locating surfaces are substantially parallel to the first side of the first filter media panel and the second tapered locating surfaces are substantially parallel to the first side of the second filter media panel.

In one embodiment, the first tapered locating surfaces are substantially perpendicular to the interior face of the first filter media panel and the second tapered locating surfaces are substantially perpendicular to the interior face of the second filter media panel.

In one embodiment, the first and second filter media panels are pleated media panels formed from a sheet of filter media having a plurality of panels formed by alternating folds, the folds extending longitudinally between the third and fourth sides of the filter media panels, the first side of the filter media panels being adjacent the base frame and the second side of the filter media panel being spaced apart from the first side and the base frame, the third and fourth sides of the filter media panels extending between the first and second sides.

In another embodiment, a filter element including first and second filter media panels, a support frame and a base frame is provided. Each filter media panel defines first, second, third and fourth sides. The first and second sides are offset from one another and extend between the third and fourth sides. The first and second filter media panels define interior faces. The interior faces of the first and second filter media panels generally facing each other. The support frame maintains the first and second filter media panels in a generally spaced orientation forming a cavity therebetween. The base frame defines a first opening in fluid communication with the cavity. The support frame and base frame maintaining the interior faces of the first and second filter media panels in a non-parallel orientation with the first sides of the first and second panels spaced part from one another at a greater distance than the second sides of the first and second panels such that the cavity is generally wedge shaped. The base frame defines first and second tapered locating surfaces. The first side of the first filter media panel supported on the first tapered locating surfaces and the first side of the second filter media panel supported on the second tapered locating surfaces.

In one embodiment, the first and second tapered locating surfaces are non-perpendicular and non-parallel to one another.

In one embodiment, the first and second tapered locating surfaces are non-perpendicular and non-parallel to a bisecting plane extending between the first and second filter media panels. The first and second tapered locating surfaces extend at a first angle relative to the bisecting plane. The interior faces of the first and second filter media panels extending at a second angle relative to the bisecting plane, the first and second angles being substantially complimentary.

In one embodiment, the first tapered locating surfaces are substantially parallel to the first side of the first filter media panel and the second tapered locating surfaces are substantially parallel to the first side of the second filter media panel.

In one embodiment, the first tapered locating surfaces are substantially perpendicular to the interior face of the first filter media panel and the second tapered locating surfaces are substantially perpendicular to the interior face of the second filter media panel.

In another embodiment, a filter element including first and second filter media panels, a support frame and a base frame is provided. Each filter media panel defines first, second, third and fourth sides. The first and second sides are offset from one another and extend between the third and fourth sides. The first and second filter media panels define interior faces. The interior faces of the first and second filter media panels generally facing each other. The support frame maintains the first and second filter media panels in a generally spaced orientation forming a cavity therebetween. The base frame defines a first opening in fluid communication with the cavity. The support frame maintains the interior faces of the first and second filter media panels in a non-parallel orientation with the first sides of the first and second panels being spaced part from one another at a greater distance than the second sides of the first and second panels such that the cavity is generally wedge shaped. The support frame being attached to the base frame.

In one embodiment, the support frame is snap attached to the base frame.

In one embodiment, a handle member is attached to the support frame proximate the second sides of the filter media panels.

In one embodiment, the support frame has receptacles and the handle member has projections that extend into the receptacles.

In one embodiment, the base frame has a first portion captured in a first end cap structure and a second portion captured in a second end cap structure.

In one embodiment, the first end cap structure operably seals the third side of the first and second filter media panels and the second end cap structure operably seals the fourth side of the first and second filter media panels. The support frame has first, second, third and fourth sides with, the third and fourth sides being spaced apart and extending between the first and second sides. The third side of the support frame is captured by the first end cap structure and the fourth side of the support frame is captured by the second end cap structure.

In one embodiment, a first end of the handle member is captured by the first end cap structure and a second opposed end of the handle member is captured by the second end cap structure.

In one embodiment, the handle member includes a gripping portion configured to be gripped by a user. The gripping portion is positioned between and offset from the first and second ends of the handle member.

In one embodiment, the end cap structures are generally cup shaped and define an end cap cavity holding an adhesive therein. The end cap structures capture the components within the adhesive within the end cap cavity.

In another embodiment, a frame for holding first and second filter media panels including a base frame and a support frame is provided. The base frame defines a first opening therethrough. The support frame is attached to the base frame and extends outward therefrom. The base frame and support frame are configured to maintain the first and second filter media panels in a generally spaced orientation forming a cavity therebetween when mounted to the support frame and base frame. The support frame and base frame maintain interior faces of the first and second filter media panels in a non-parallel orientation with the first sides of the first and second panels spaced part from one another at a greater distance than the second sides of the first and second panels such that the cavity is generally wedge shaped.

In one embodiment, the support frame has first, second, third and fourth sides. The first side defines a second opening in fluid communication with the first opening in the base frame. The third and fourth sides have converging edges that converge proximate the second side.

In one embodiment, the third side is formed by a pair of third side elongated segments that converge at the second side and a third side cross brace that extends between the pair of third side elongated segments. The third side cross brace is closer to the first side than the second side. A pair of fourth side elongated segments converge at the second side and a fourth side cross brace extends between the pair of first side elongated segments. The fourth side cross brace is closer to the first side than the second side.

In one embodiment, the first side of the support frame is provided by a pair of first side elongated segments that extend generally parallel to one other between the third and fourth sides.

In one embodiment, the third and fourth side cross braces are located at the first side.

In one embodiment, the third and fourth side cross braces include connection members for connecting the support frame to the main frame.

In another embodiment a filter element including first and second filter media panels, a support frame, a base frame and first and second support screens is provided. Each filter media panel defines first, second, third and fourth sides. The first and second sides are offset from one another and extend between the third and fourth sides. The first and second filter media panels define interior faces. The interior faces of the first and second filter media panels generally face each other. The support frame maintains the first and second filter media panels in a generally spaced orientation forming a cavity therebetween. The support frame is located between first and second filter media panels. The base frame defines a first opening in fluid communication with the cavity and is located proximate the first sides of the first and second filter media panels. Each screen is substantially L-shaped having a first side portion and an interior face portion. The first side portion of the first support screen is adjacent the first side of the first filter media panel and the interior face portion of the first support screen is adjacent the interior face of the first filter media. The first side portion of the second support screen is adjacent the first side of the second filter media panel and the interior face portion of the second support screen is adjacent the interior face of the second filter media.

In one embodiment, the interior face portion of the first support screen is positioned between the support frame and the interior face of the first filter media panel and the first side portion of the first support screen is positioned between the base frame and the first side of the first filter media panel. The interior face portion of the second support screen is positioned between the support frame and the interior face of the second filter media panel and the first side portion of the second support screen is positioned between the base frame and the first side of the second filter media panel.

In one embodiment, each of the first and second support screens is formed from separate first and second pieces of screen with the first side portion being formed from the first piece of screen and the interior face portion being formed from the second piece of screen.

In one embodiment, the first and second support screens are formed from a single piece.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
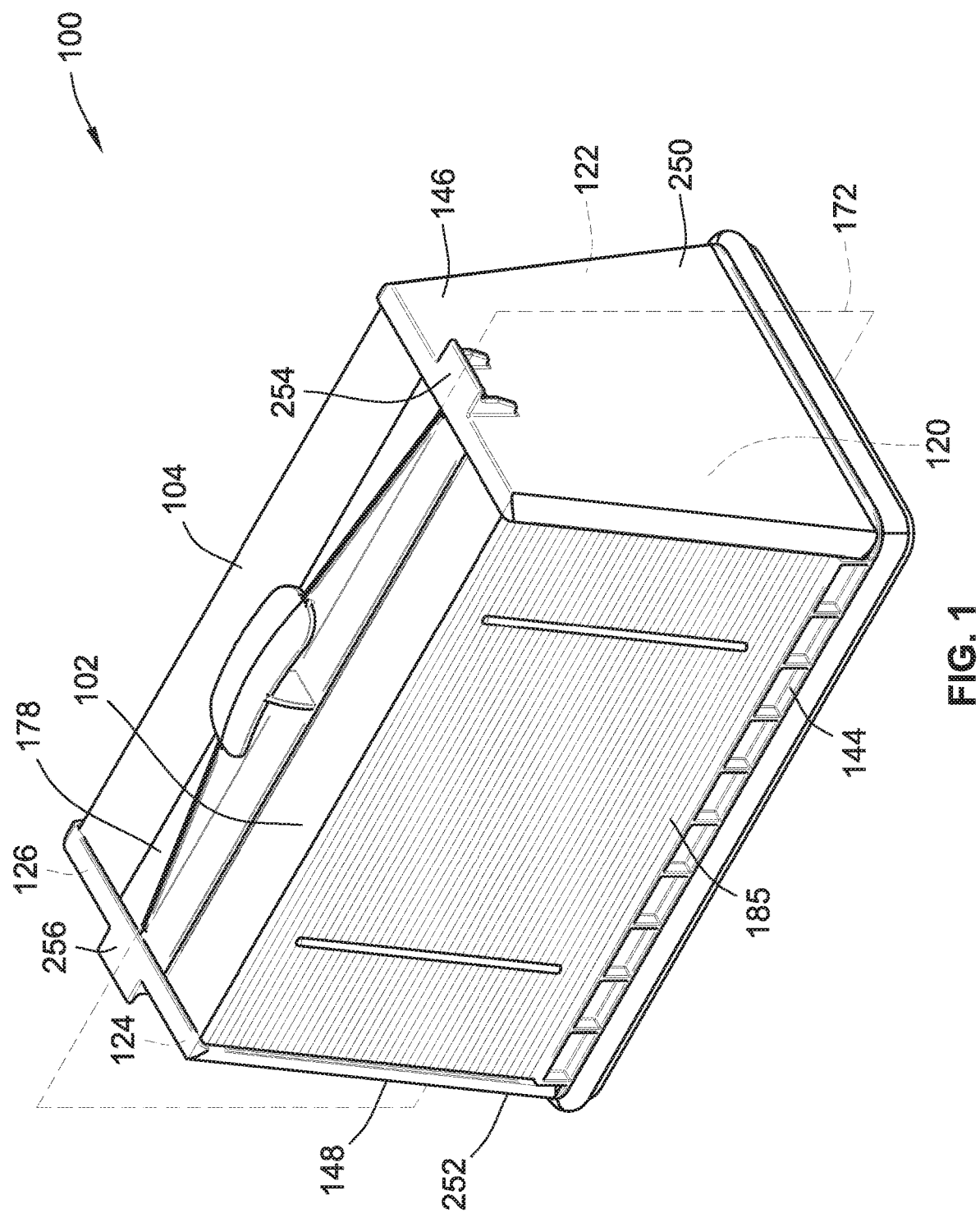
FIG. 1 is a perspective illustration of a first embodiment of a filter element according to the invention.

FIG. 1 is a perspective illustration of an embodiment of a filter element 100 for filtering air. The filter element 100 will filter fluid such as air as it is passed therethrough to remove particulates and impurities carried by the fluid being filtered.

The filter element 100 includes a pair of filter media panels 102, 104 through which the fluid passes that performs the filtering. The filter media panels 102, 104 may be formed from various different types of filter media and in one embodiment the filter media panels 102, 104 are provided by pleated filter media. The pleated filter media is formed by a plurality of adjacent panels connected to one another at a plurality of alternating folds in an accordion fashion.

Figure 2:
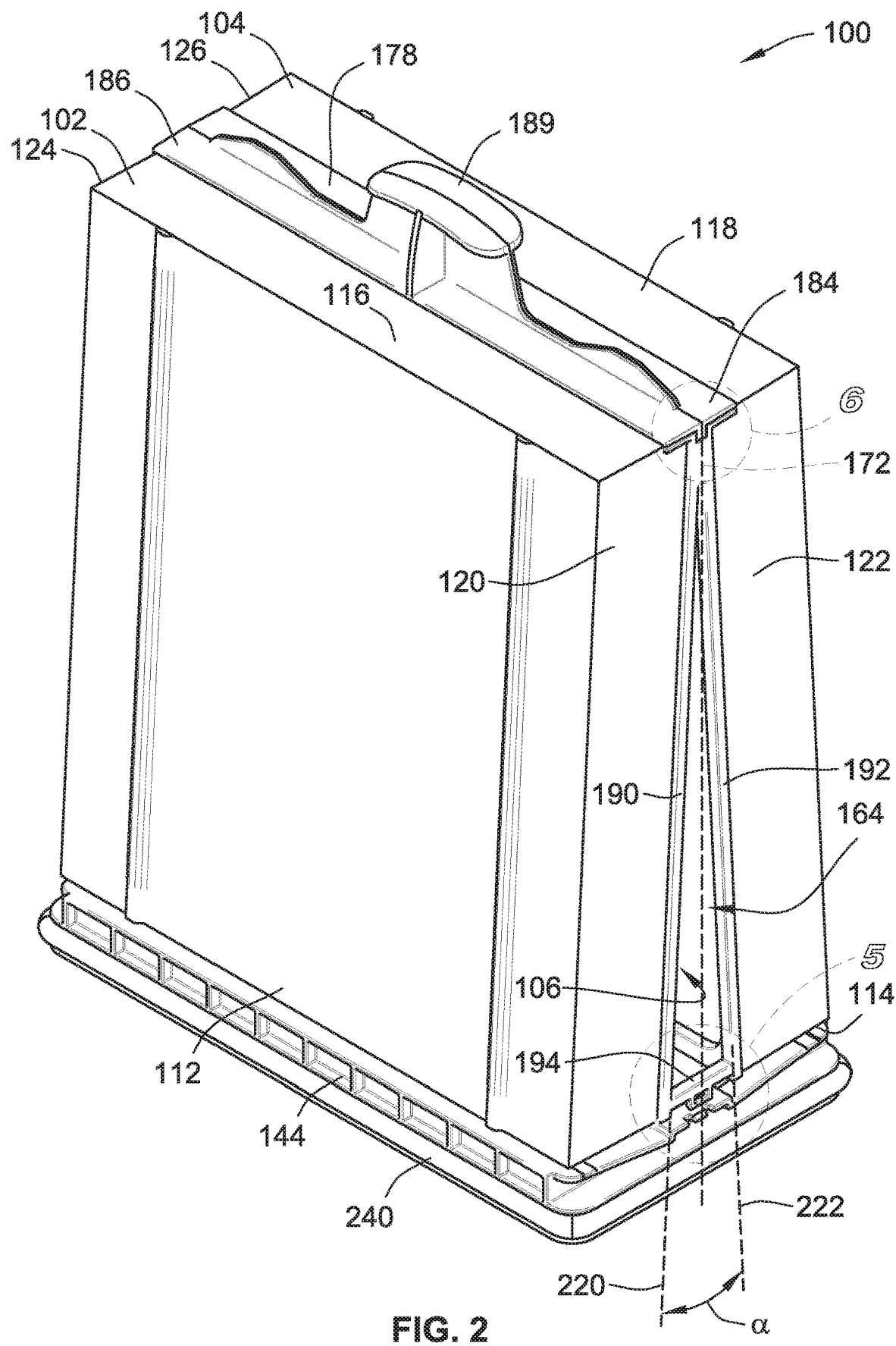
FIG. 2 is a partial perspective illustration of the filter element of FIG. 1.

With reference to FIG. 2, the filter media panels 102, 104 are mounted to a multi-component holding assembly and oriented such that the filter media panels extend at an angle α relative to one another. Due at least to the angle α between the filter media panels 102, 104, the filter media panels 102, 104 form a cavity 106 therebetween.

Figure 3:
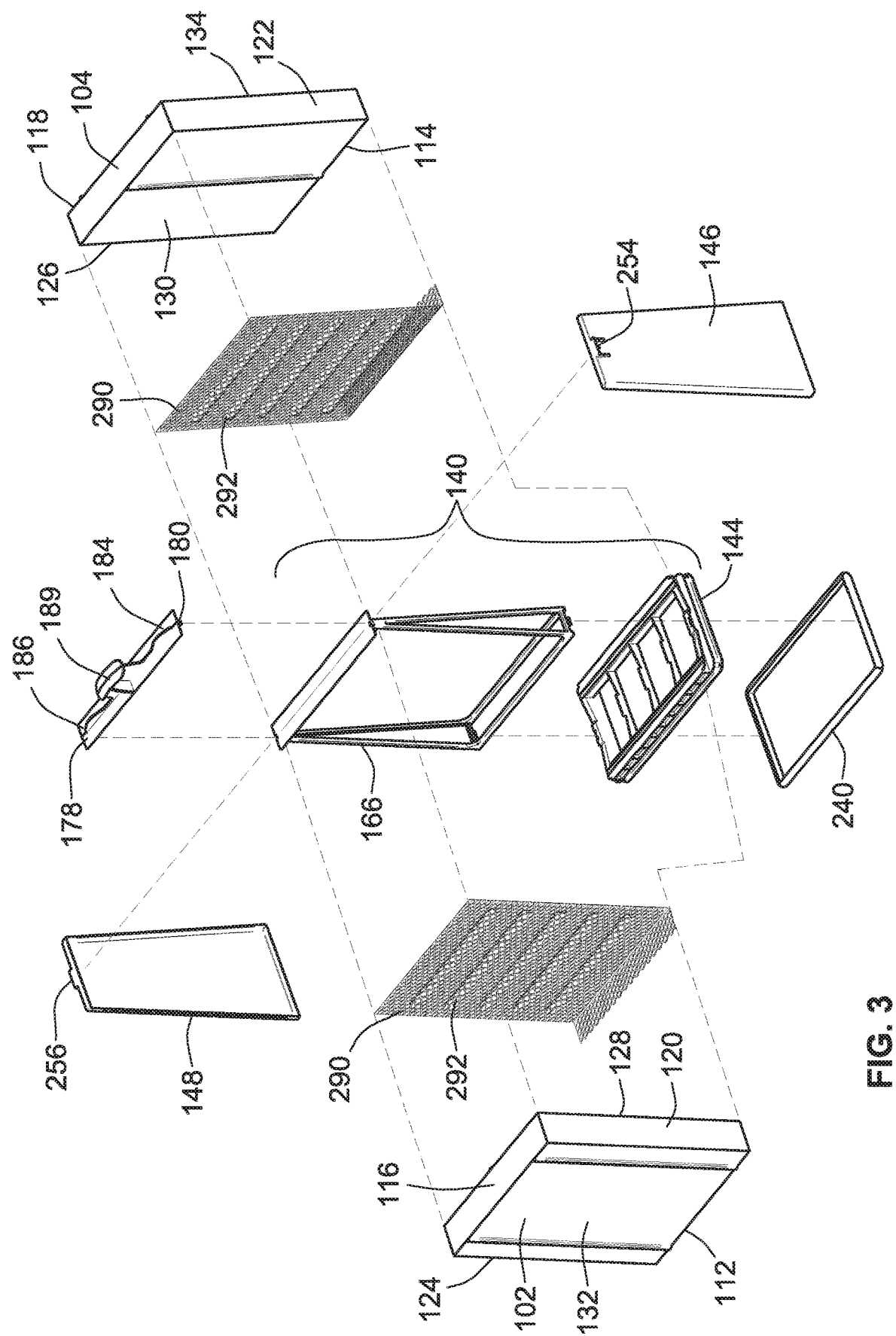
FIG. 3 is an exploded illustration of the filter element of FIG. 1.

With reference to FIG. 3, the filter media panels 102, 104 each have a generally rectangular periphery including a first side 112, 114, a second side 116, 118, a third side 120, 122 and a fourth side 124, 126. The filter media panels 102, 104 also include inner faces 128, 130 that face one another when assembled and outer faces 132, 134 that face away from one another when assembled. The faces are bounded by the first 112, 114, second 116, 118, third 120, 122 and fourth 124, 126 sides. The inner and outer faces 128, 130, 132, 134 may be considered flow faces as the primary fluid flow through the filter media panels 102, 104 is through these faces 128, 130, 132, 134.

The multi-component holding assembly 140 is configured to mount the filter media panels 102, 104 in the desired orientation. The multi-component holding assembly 140 of the illustrated embodiment generally includes a support frame 142, a base frame 144, first and second end cap structures 146, 148 and a second side support structure 178.

The support frame 142 generally maintains the first and second filter media panels in the desired spaced orientation such that cavity 106 (FIG. 2) is formed. In the illustrated embodiment, the spaced orientation is angled at angle α as indicated previously. In this configuration, the interior faces 128, 130 are maintained in a non-parallel, non-perpendicular orientation with the first sides 112, 114 of the first and second filter media panels 102, 104 spaced apart from one another a greater distance than the second sides 116, 118. This orientation gives cavity 106 a wedge shape.

Figure 4:
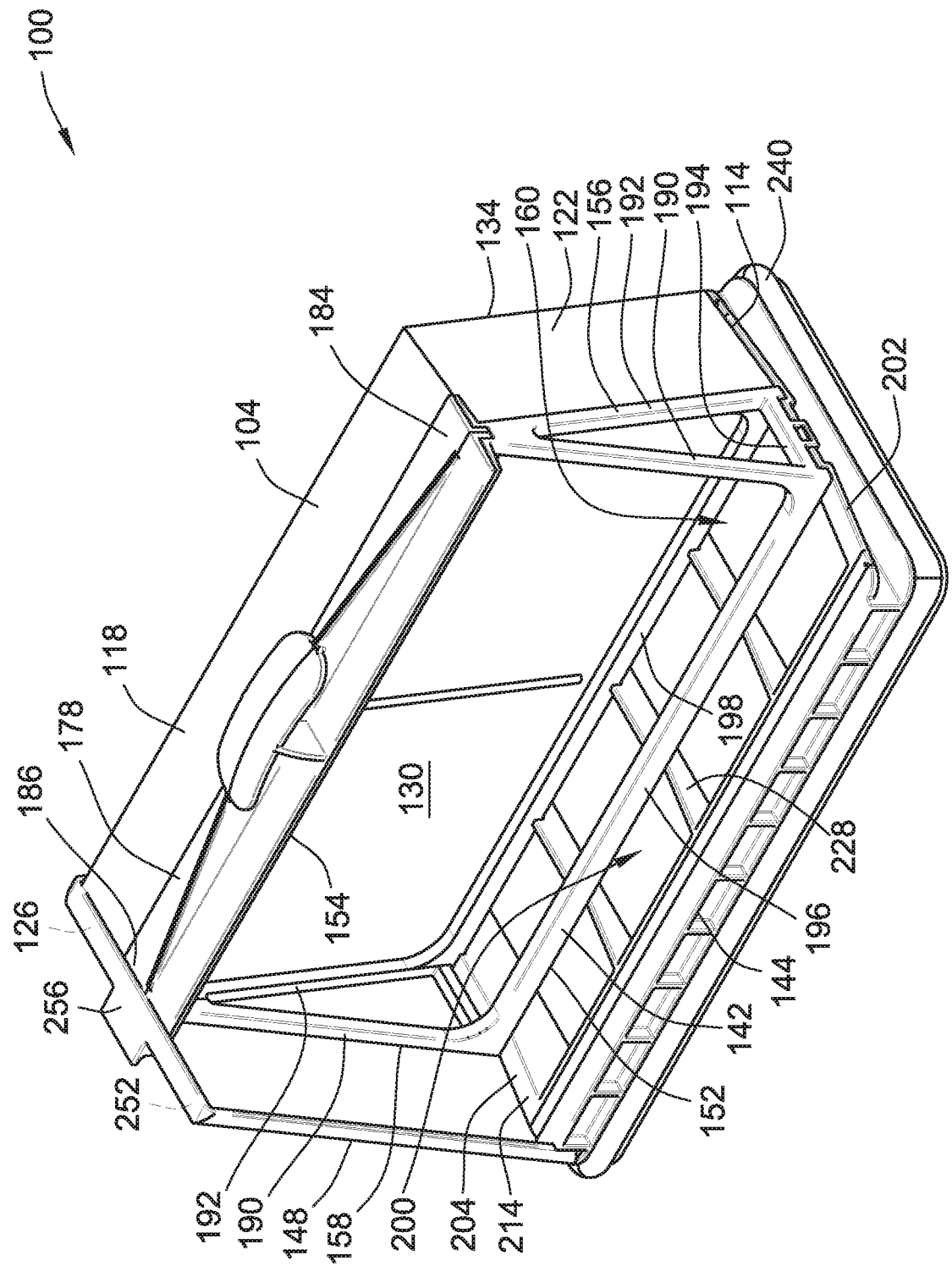
FIG. 4 partial perspective illustration of the filter element of FIG. 1.
Figure 6:
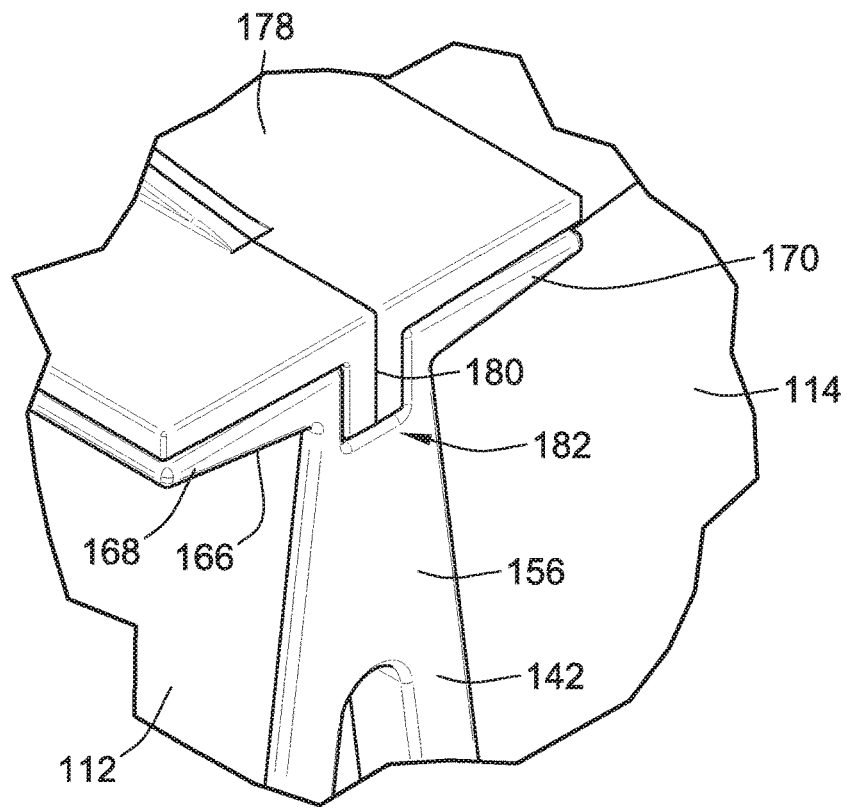
FIG. 6 is an enlarged partial illustration of the filter element of FIG. 1.
Figure 13:
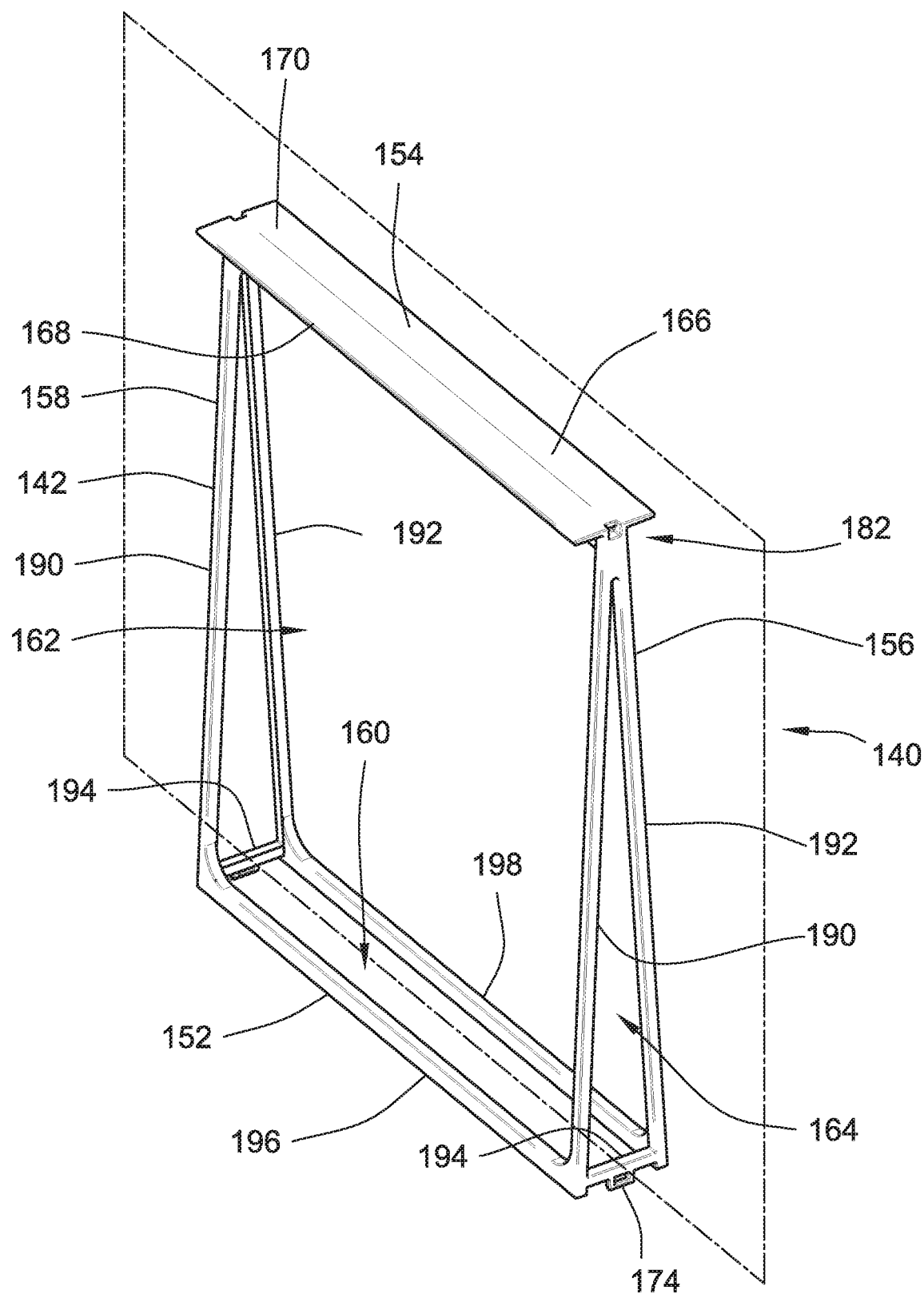
FIG. 13 illustrates the support frame of the filter element of FIG. 1.

With additional reference to FIG. 13, the support frame 142 generally defines first, second, third and fourth sides 152, 154, 156, 158. The first and second sides 152, 154 are generally offset from one another and extend between the third and fourth sides 156, 158. With additional reference to FIG. 4 (which has filter media panel 102 and end cap structure 146 removed for clarity, in the assembled state, the first side 152 of the support frame 142 is adjacent the first sides 112, 114 of the filter media panels 102, 104, the second side 154 of the support frame 142 is adjacent the second sides 116, 118 of the filter media panels 102, 104, the third side 156 of the support frame 142 is adjacent the third sides 120, 122 of the filter media panels 102, 104 and the fourth side 158 of the support frame 142 is adjacent the fourth sides 124, 126 of the filter media panels 102, 104.

In this embodiment, the first side 152 of the support frame 142 defines a first side opening 160 through which fluid flows during the filtering process to exit cavity 106 between the filter media panels 102, 104. The first, second, third and fourth sides 152, 154, 156, 158 of the support frame 142 also bound first and second flow openings 162, 164 that are adjacent to filter media panels 102, 104, respectively, when assembled, through which fluid flows prior to or after passing through corresponding filter media panels 102, 104 depending on if the filter element 100 is configured for inside-out or outside-in fluid flow.

The support frame 142, in the illustrated embodiment, includes an overlap portion 166 that has opposite first and second flange portions 168, 170 that extend laterally outward in opposite directions. The first and second flange portions 168, 170 extend laterally outward such that the overlap portion 166 overlaps at least a portion of each of the second sides 116, 118 of the first and second filter media panels 102, 104. The bottom surfaces of the flange portions 168, 170 adjacent the filter media panels 102, 104 may be angled relative to a central bisecting plane 172 of the support frame 142 at an angle equivalent to angle α/2 plus ninety degrees.

Figure 5:
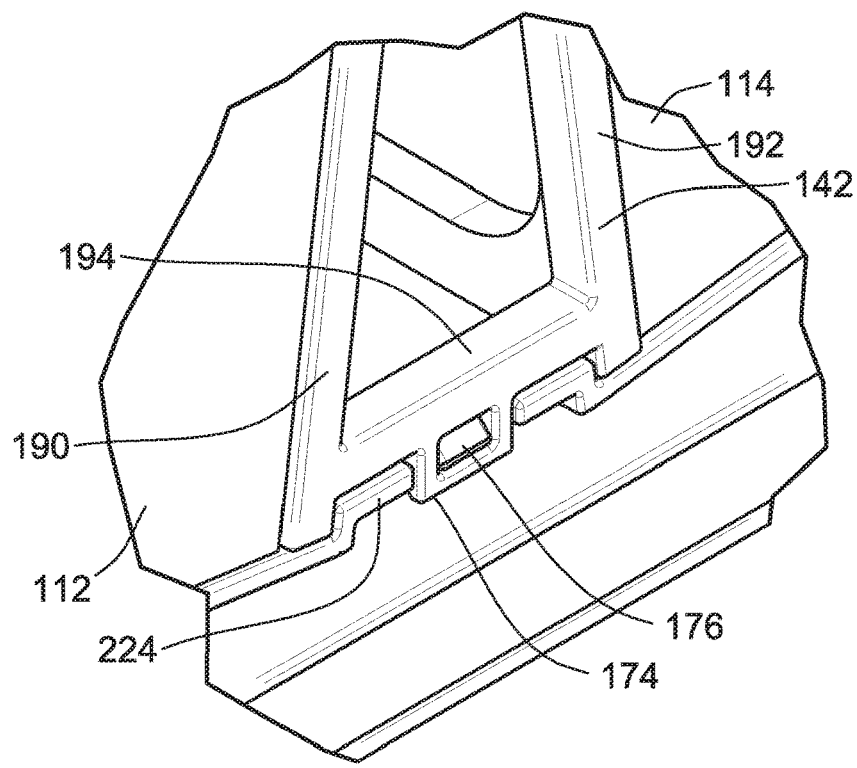
FIG. 5 is an enlarged partial illustration of the filter element of FIG. 1.

The support frame 142 is operably connected to the base frame 144. The support frame 142 in the illustrated embodiment includes snap structures 174 that snap engage corresponding snap structures 176 of the base frame 144. In the illustrated embodiment, snap structures 174 are provided by apertures formed in a portion of the support frame 142 proximate the intersection of the first side 152 with the third and fourth sides 156, 158. Snap structures 176 are outward extending projections sized and positioned to extend into the apertures provided by snap structures 174. The projections provided by the snap structures 176 may have tapers or ramps to facilitate connecting the support frame 142 to the base frame 144. Engagement of the snap structures 174 with snap structures 176 is illustrated in FIG. 5.

In alternative embodiments, the snap structures could be reversed and other cooperating snap structures are contemplated. The snap engagement facilitates initial assembly of the multi-component holding assembly 140 prior to mounting of the filter media panels 102, 104.

Figure 7:
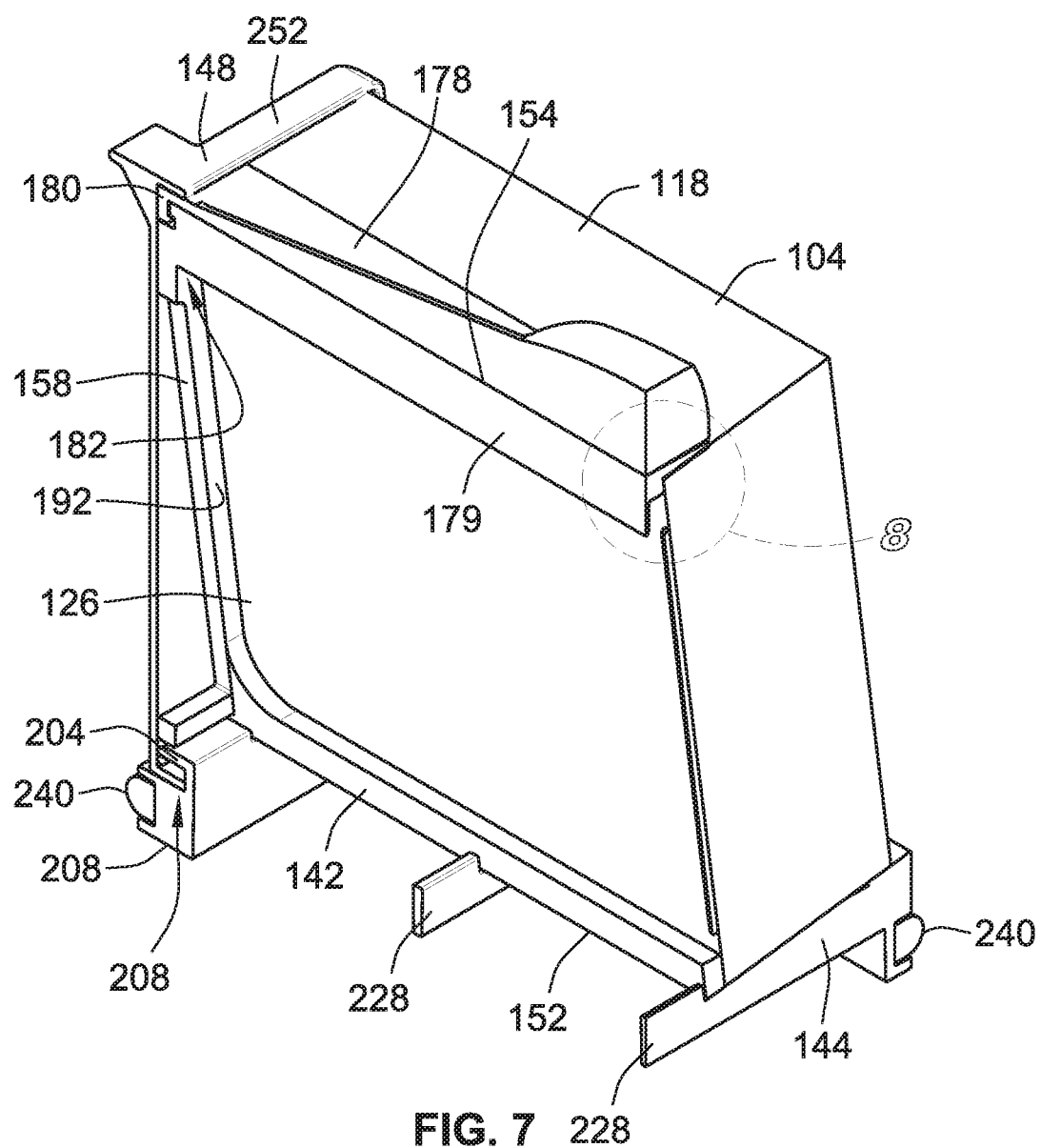
FIG. 7 is partial cross-sectional illustration of the filter element of FIG. 1.

A second side support structure 178 is operably connected to the second side 154 of the support frame 142. The second side support structure 178 includes connection elements 180 that extend into recesses 182 (also referred to as receptacles) formed in the support frame 142. Preferably, the fit between the connection elements 180 and the recesses provides a snap engagement. The second side support structure 178 extends between opposed first and second ends 184, 186 with a connection element 180 at each end. The cooperating catch arrangement of the connection elements 180 and recesses 182 may include catches or undercuts to form an improved connection between the support frame 142 and the second side support structure 178 such as illustrated in FIG. 7.

Figure 8:
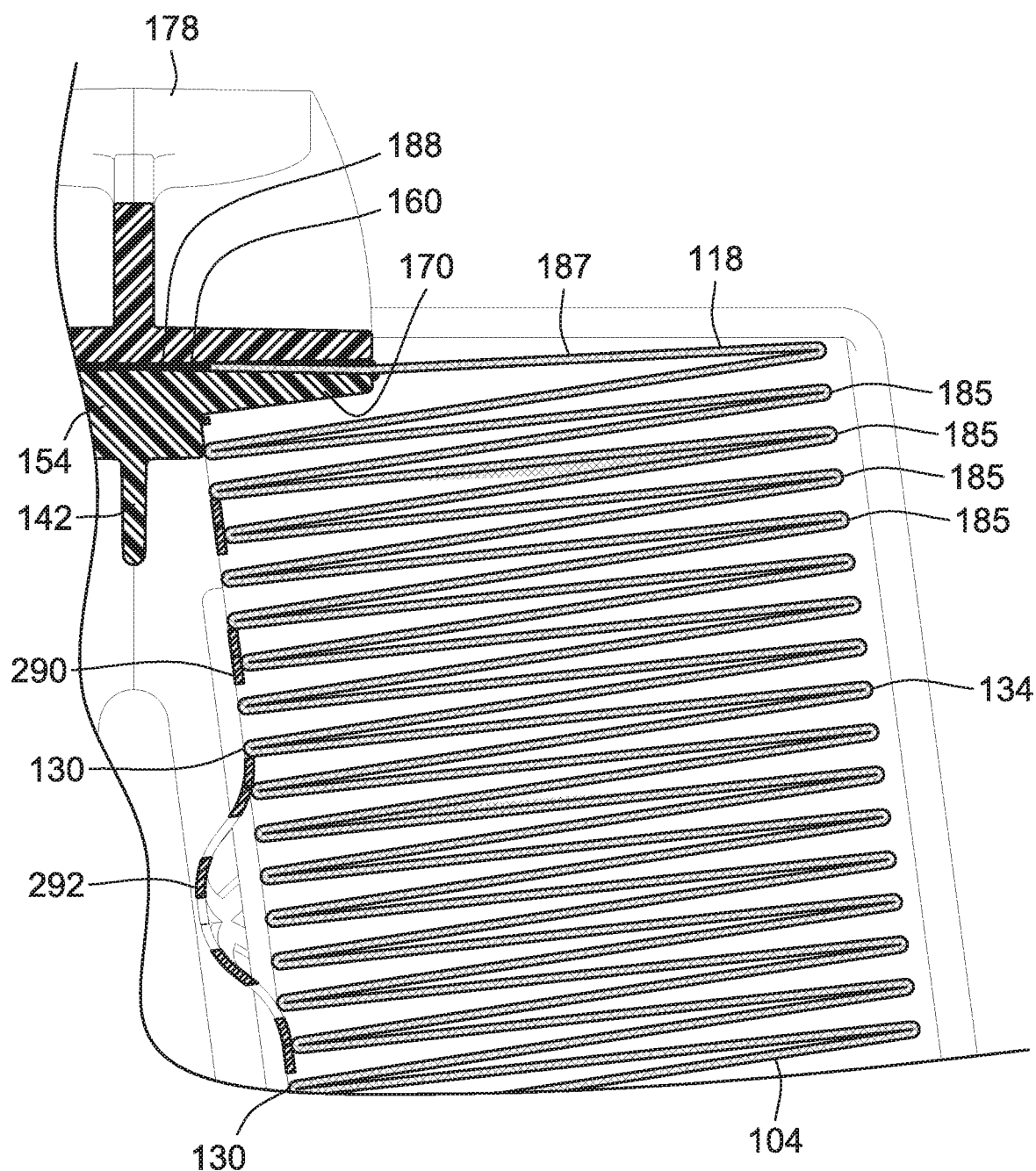
FIG. 8 is an enlarged partial cross-sectional illustration of the filter element of FIG. 1.

The second side support structure 178 overlaps the flange portions 168, 170 of the support frame 142. With additional reference to FIG. 8, in one embodiment where the filter media panels 102, 104 are formed from pleated media with the folds 185 (see FIG. 1) of the pleated media extending perpendicularly between the third and fourth sides 120, 122, 124, 126 of the filter media panels, at least one panel 187 of each filter media panel 102, 104 is pinched between a top surface of the corresponding flange portion 102, 104 and a bottom surface of the second side support structure 178. A seal material 188, such as a glue bead or adhesive is applied to seal the portion of the pleated media between the second side support structure 178 and the second side 154, e.g. flange portions 168, 170, to seal the filter media panels 102, 104 along the second sides 116, 118 thereof. The seal material 188 will also help secure the second side support structure to the second side 154 of the support frame 142. The support frame 142 defines a second side stop 179 that extends between the third and fourth sides 156, 158 against which the inner faces 128, 130 of the first and second filter media panels 102, 104 proximate the second sides 116, 118 thereof rest when in an assembled state.

The second side support structure 178 (also referred to as a handle member) includes a handle 189 including a gripping portion configured to be grasped by a user to remove the filter element 100 at maintenance intervals. The handle 189 is located axially between the opposed first and second ends 184, 186 of the second side support structure 178.

With reference to FIG. 13, in the illustrated embodiment, the third and fourth sides 156, 158 are formed from frame segments including a pair of converging elongated segments 190, 192 and a cross-brace segment 194 that extends between the elongated segments 190, 192. The pair of converging elongated segments 190, 192 for the third and fourth sides 156, 158 converge proximate the second side 154. The snap structures 174 are formed as part of the cross brace segments 194.

The first side 152 of the support frame is defined by the cross-brace segments 194 and a pair of first side elongated segments 196, 198 that extend generally parallel to one another between the third and fourth sides 156, 158 in a spaced apart relation.

The support frame opening is defined by the cross-brace segments 194 and the pair of first side elongated segments 196, 198.

When assembled, the inner faces 128, 130 of the first and second filter media panels may rest against the elongated segments 190, 192 and 196, 198.

The base frame 144 cooperates with the support frame 142 to support the filter media panels 102, 104. The base frame 144 supports a first side 112, 114 of the filter media panels 102, 104.

Figure 12:
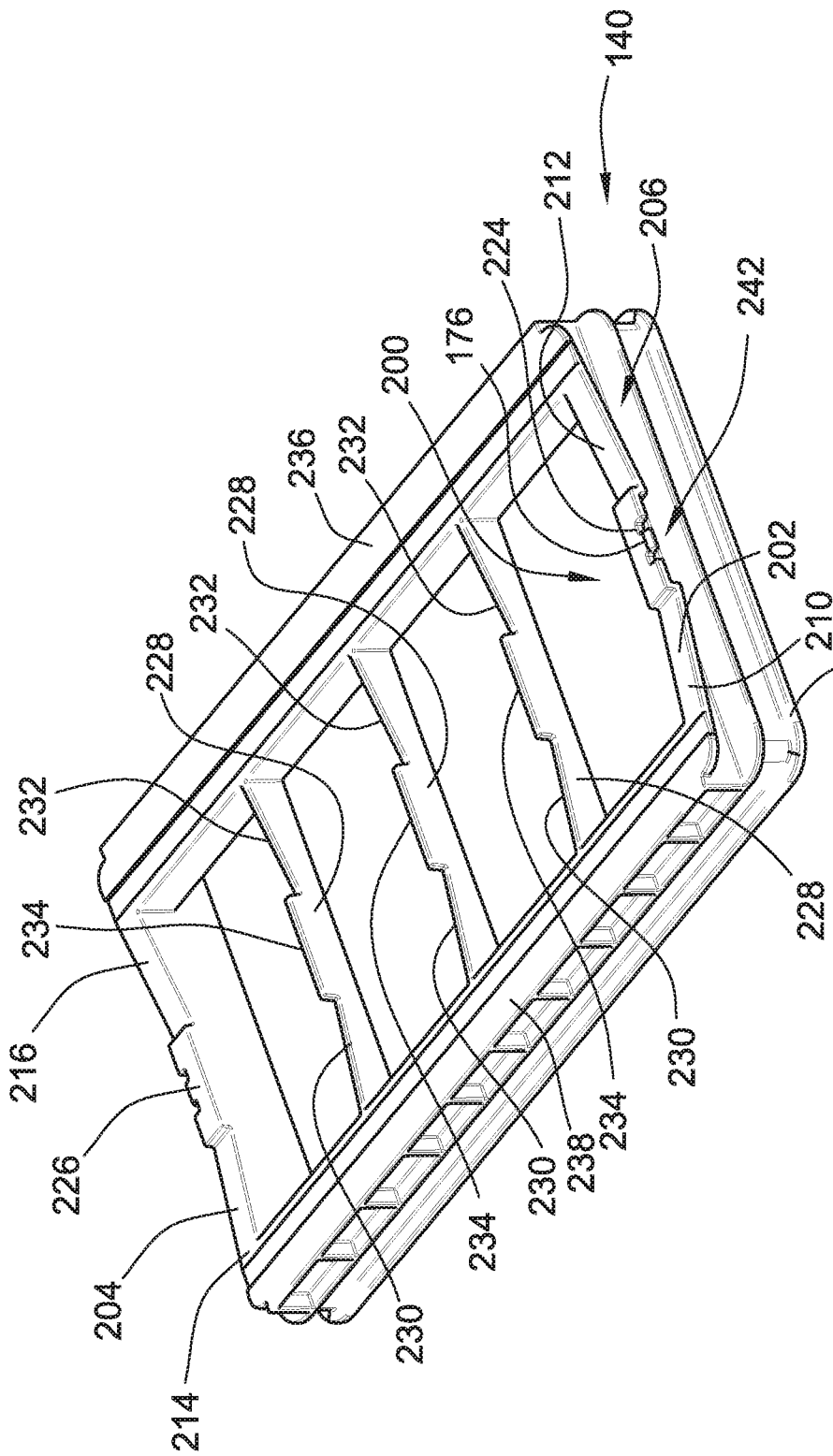
FIG. 12 illustrates the base frame of the filter element of FIG. 1.

With reference to FIG. 3 and primary reference to FIG. 12, the base frame 144 defines a base frame opening 200 through which dirty fluid enters or clean fluid exits the filter element based on the flow direction of the fluid through the filter element. More than one base frame opening may be provided if multiple sets of filter media panels are mounted to a single base frame 144.

In the illustrated embodiment, the base frame 144 includes a pair of opposed captured portions in the form of first and second outward extending flanges 202, 204. The outward extending flanges 202, 204 extend away from one another on opposite sides of the base frame opening 200 and form under cuts 206, 208.

Locating surfaces 210, 212, 214, 216 of the outward extending flanges 202, 204 support opposed ends of the first sides 112, 114 of the filter media panels 102, 104. In the illustrated embodiment, the locating surfaces 210, 212, 214, 216 are tapered relative to central plane 172 at angle of 90 minus angle α/2. As such, the locating surfaces are generally perpendicular to the planes 220, 222 (see FIG. 2) defined by the first, second, third and fourth sides 152, 154, 156, 158 of the support frame 142 against which the first and second filter media panels 102, 104 rest when assembled. Locating surfaces 210, 214 that support the first filter media panel 102 are generally parallel to flange portion 168 of the support frame 142 as well as the first side 112 of the filter media panel 102 while locating surfaces 212, 216 support the first side 114 of filter media panel 104 and are general parallel to flange portion 170 of the support frame 142 as well as the first side 114 of filter media panel 104. The tapered locating surfaces are generally perpendicular to the inner and outer faces 128, 130, 132, 134 of the filter media panels 102, 104. Locating surfaces 210, 212 of the first flange 202 extend at a non-parallel non-perpendicular angle relative to one another as well as bisecting central plane 172. Locating surfaces 214, 216 of the first flange 204 extend at a non-parallel non-perpendicular angle relative to one another as well as bisecting central plane 172.

Flanges 202, 204 each define a corresponding elevated segment 224, 226 positioned between corresponding tapered locating surfaces 210, 212 and 214, 216. The elevated segments 224, 226 define snap structures 176 that cooperate with snap structures 174 as described above. The elevated segments 224, 226 are straddled by segments 196, 198 when assembled to assist in locating the support frame 142 relative to the base frame 144.

The base frame 144 includes support members 228 that have tapered surfaces 230, 232 similar to tapered locating surfaces 210, 212, 214, 216 and that facilitate support of the first sides 112, 114 of the filter media panels 102, 104 as well as elevated projections 234 (also referred to as tabs) for locating the elongated segments 196, 198. The support members 228 extend across base frame opening 200 between parallel extending side member portions 236, 238

The base frame 144 carries a sealing gasket 240 used to seal the filter element 100 to a filter housing (not shown). The sealing gasket 240 in the illustrated embodiment is a continuous piece of D-style rope stock. The sealing gasket 240 is carried in an annular groove 242 that circumscribes the base frame 144. In the illustrated embodiment, the sealing gasket 240 defines a radial seal. However, other embodiments could define an axial seal.

The first and second end cap structures 146, 148 assist in operably sealing the filter media panels 102, 104 to the support frame 142 and/or base frame 144 to prevent fluid from bypassing the filter media panels 102, 104.

The first end cap structure 146 operably seals the third sides 120, 122 of the filter media panels 102, 104 and the second end cap structure 148 operably seals the fourth sides 124, 126.

The first outward extending flange 202 of the base frame 144 is captured in the first end cap structure 146 while the second outward extending flange 204 of the base frame 144 is captured in the second end cap structure 148. Not only are the first and second outward extending flanges 202, 204 captured by the first and second end cap structures 146, 148, but the third side 156 of the support frame 142 is captures by the first end cap structure 146 while the fourth side 158 of the support frame 142 is captured by the second end cap structure 148.

In an embodiment, the first and second end cap structures 146, 148 are composite structures with each including a cupped end cap 250, 252 and adhesive within the cupped end cap 250, 252. The cupped end caps 250, 252 form wells for holding the adhesive. The adhesive may be a foamed urethane or known potting material other materials include hot melt, plastisol, epoxy, non-foamed urethane, etc. The adhesive of the first end cap structure 146 captures the third sides 120, 122 of the filter media panels 102, 104, the first outward extending flange 202, the third side 156 of the support frame 142 and the first end 184 of the second side support structure 178. The adhesive of the second end cap structure 148 captures the fourth sides 124, 126 of the filter media panels 102, 104, the second outward extending flange 204, the fourth side 158 of the support frame 142 and the second end 186 of the second side support structure 178.

The cupped end caps 250, 252 also each include outward extending mounting flanges 254, 256 for assisting in mounting the filter element 100 in a filter housing (not shown).

In addition to the adhesive of the end cap structures 146, 148, sealant beads may be applied between the first sides 112, 114 of the filter media panels 102, 104 and the base frame 144 to sealingly secure the filter media panels 102, 104 to the base frame 144. To further support the filter media panels 102, 104, adhesive may be applied to the tapered surfaces 230, 232 of the support members 228 as well as to the top surfaces of side members 236, 238. Further yet, adhesive is applied to the second sides 116, 118 of the filter media panels 102, 104 and the second side 154 of the support frame 142 as described above.

In FIG. 3, an optional support screens 290 are illustrated that will be positioned between the first and second filter media panels 102, 104 and the support frame 142 and the base frame 144 as will be described in more detail with regard to the embodiment of FIG. 9 described below. The support screens 290 are formed from an expanded metal to form the through apertures and include embossed rib structures 292. The rib structures 292 are pressed into the support screens 290 to provide increased support for the filter media panels 102, 104. While illustrated as being horizontal rib structures 292 that extend longitudinally between the third and fourth sides 120, 122, 124, 126 of the filter media panels 102, 104 when assembled, the rib structures 292 could have other orientations and shapes. For instance, they could extend vertically, e.g. between first and second sides 112, 114, 116, 118 or could be diagonal or form an X-shape. Preferably, the rib structures 292 extend inward and away from the corresponding media panels 102, 104 so that the rib structures 292 do not interfere with mounting or locating of the filter media panels 102, 104.

This embodiment is also illustrated with optional pleat stabilizers mounted on the inner and outer faces of the filter media panels. The pleat stabilizers may be in the form of molded components mounted to the filter media panels or could be hot melt or urethane beads applied to the filter media panels in a direction extending generally transverse to the edges/tips of the pleats when pleated media is used.

The features of the aforementioned support screens 290 and pleat stabilizers can be equally applied to all embodiments herein, where appropriate and not directly contradicted.

Figure 9:
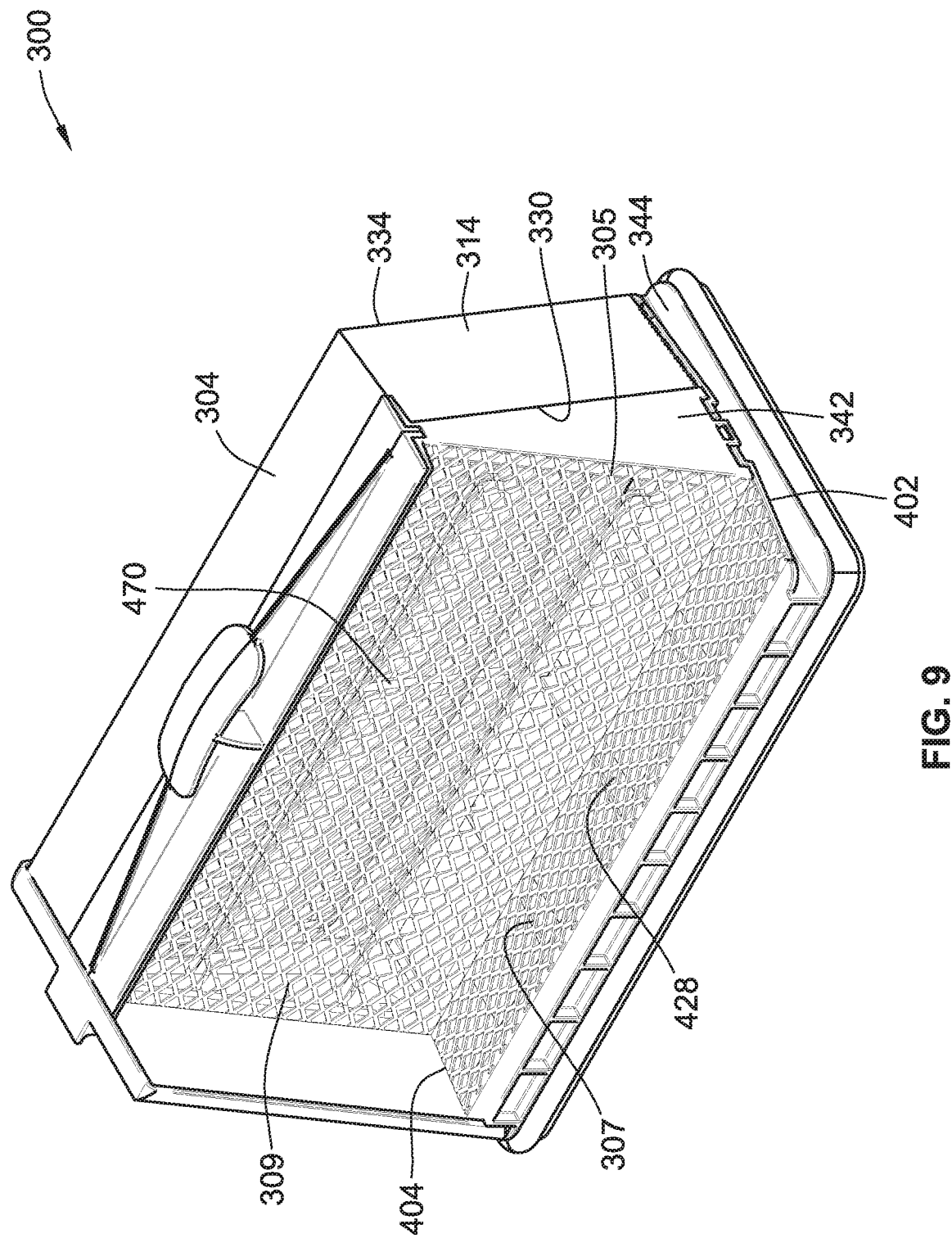
FIG. 9 is a partial perspective illustration of another embodiment of a filter element according to the invention.

FIG. 9 illustrates a further embodiment of a filter element 300 according to the teachings of the present invention. This embodiment is substantially similar to the prior embodiment and only the primary differences will be described. Where not contradicted by context, the features of this embodiment may be used with the structure of the prior embodiment. One of the filter media panels and end cap structures has been removed for ease of understanding.

This filter element 300 is generally designed for an outside-in flow. As such, fluid will flow through the outer faces 334 of the filter media panels 304 (only one is shown) first and then exit the filter element 300 through base from opening 400 formed in the bottom of the base frame 344.

To provide improved support of the filter media panels 304, first and second support screens 305 are provided. Only one of the support screens 305 is readily visible. This support screen 305 would support the filter media panel that has been removed. However, a similar support screen 305 supports filter media panel 304 that is illustrated.

The support screens 305 are positioned between the support frame 342 and base frame 344 and the filter media panels 304. The support frame 342 and base frame 344 support the support screens 305. In the illustrated embodiment, the support screens 305 are generally L-shaped having a first side portion 307 and an inner face portion 309. The first side portion 307 is positioned adjacent the first sides 314 of the filter media panels 304 as well as the outward extending flanges 402, 404 and support members 428. The inner face portion 309 is positioned adjacent the inner faces 130 of the filter media panels 304.

In some embodiments, the first side portion 307 and inner face portion 309 of the support screens are formed from a single piece of material bent to correspond to the L-shape formed by the connected support frame 342 and base frame 344. In alternative embodiments, the first side portion 307 and inner face portion 309 may be formed from separate pieces of screen. Preferably, the support screens are formed from embossed expanded screen material.

Figure 10:
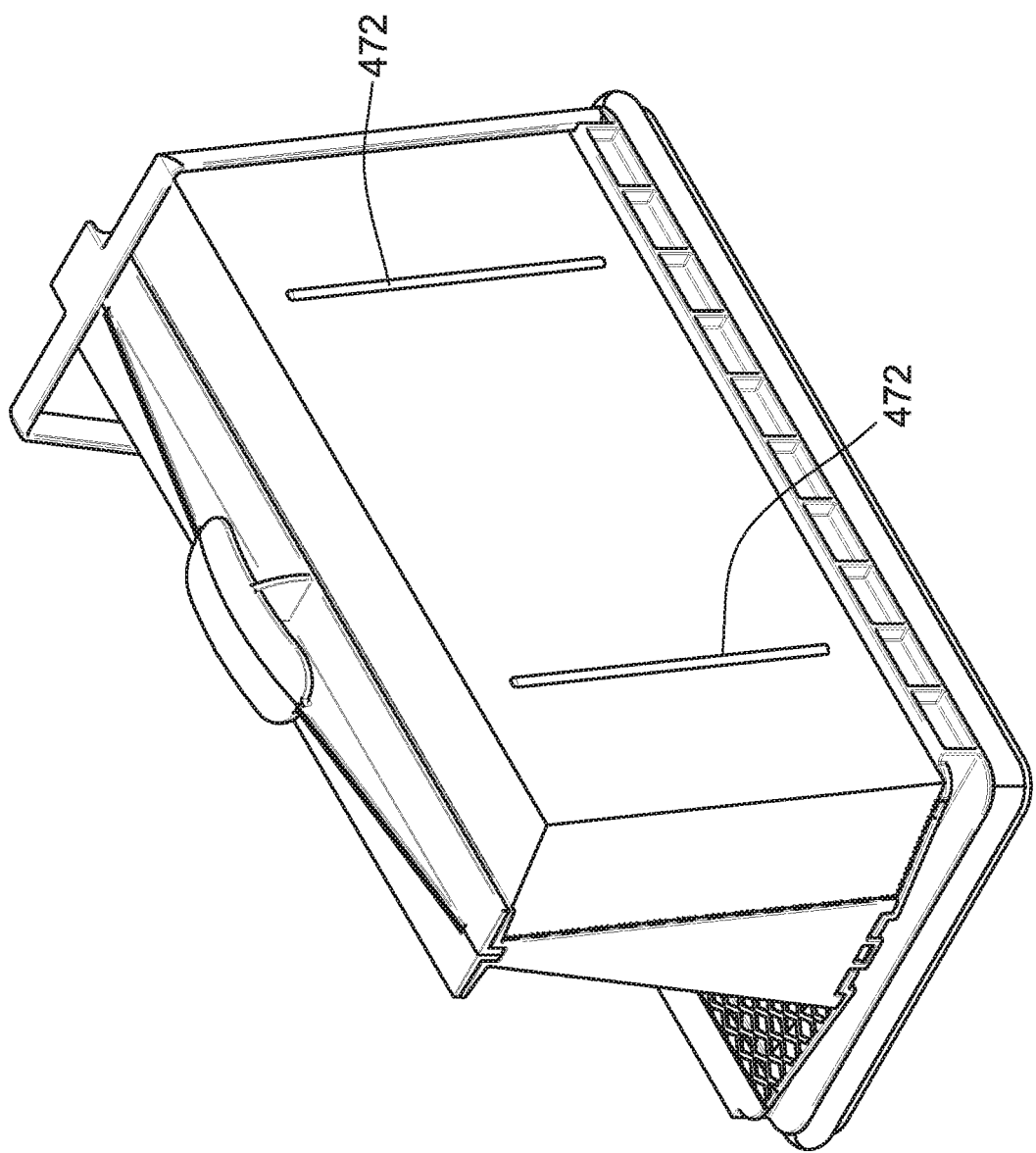
FIG. 10 is a partial perspective illustration of the filter element of FIG. 9.

With additional reference to FIG. 10, this embodiment also utilizes pleat stabilizers 472 when the filter media panels are formed from pleated filter media. The pleat stabilizers 472 provide support to the filter media due to a pressure drop across the filter media panels. The pleat stabilizers 472 may also maintain a desired spacing of the adjacent pleats.

While the end cap structures of the prior embodiments are described as multi-component end caps, other embodiments may utilize one-piece end caps. For instance, the end cap could be formed from a single piece of rigid urethane that is formed around the various components that are to be captured by the end cap structures discussed previously.

Figure 11:
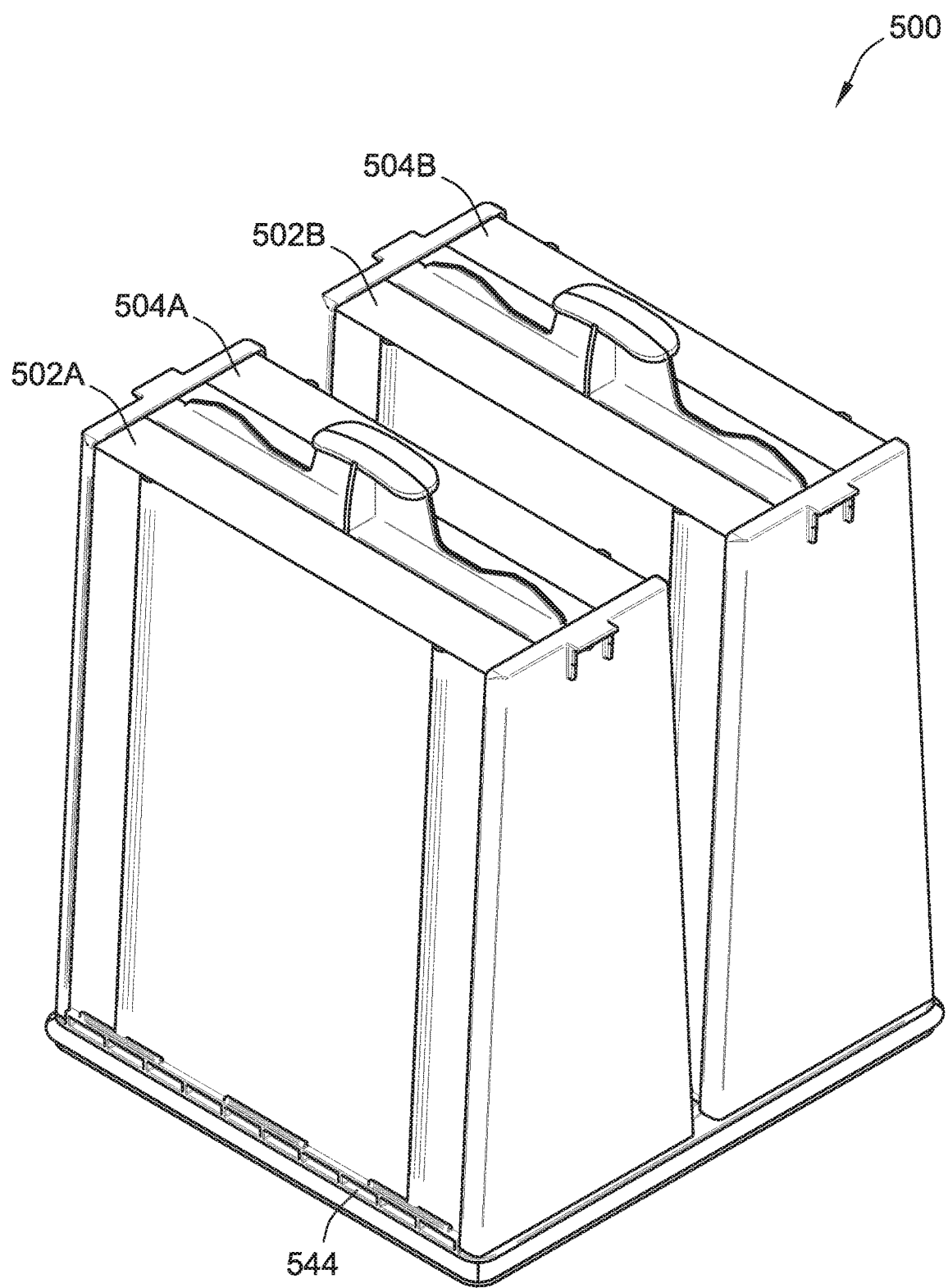
FIG. 11 is a perspective illustration of another embodiment of a filter element according to the invention.

FIG. 11 illustrates a further embodiment of a filter element 500. This embodiment is similar to and can include substantially all of the features of the prior embodiments. However, this embodiment utilizes two banks of filter media panels 502A, 504A and 502B, 504B mounted to a single base frame 544.

Figure 14:
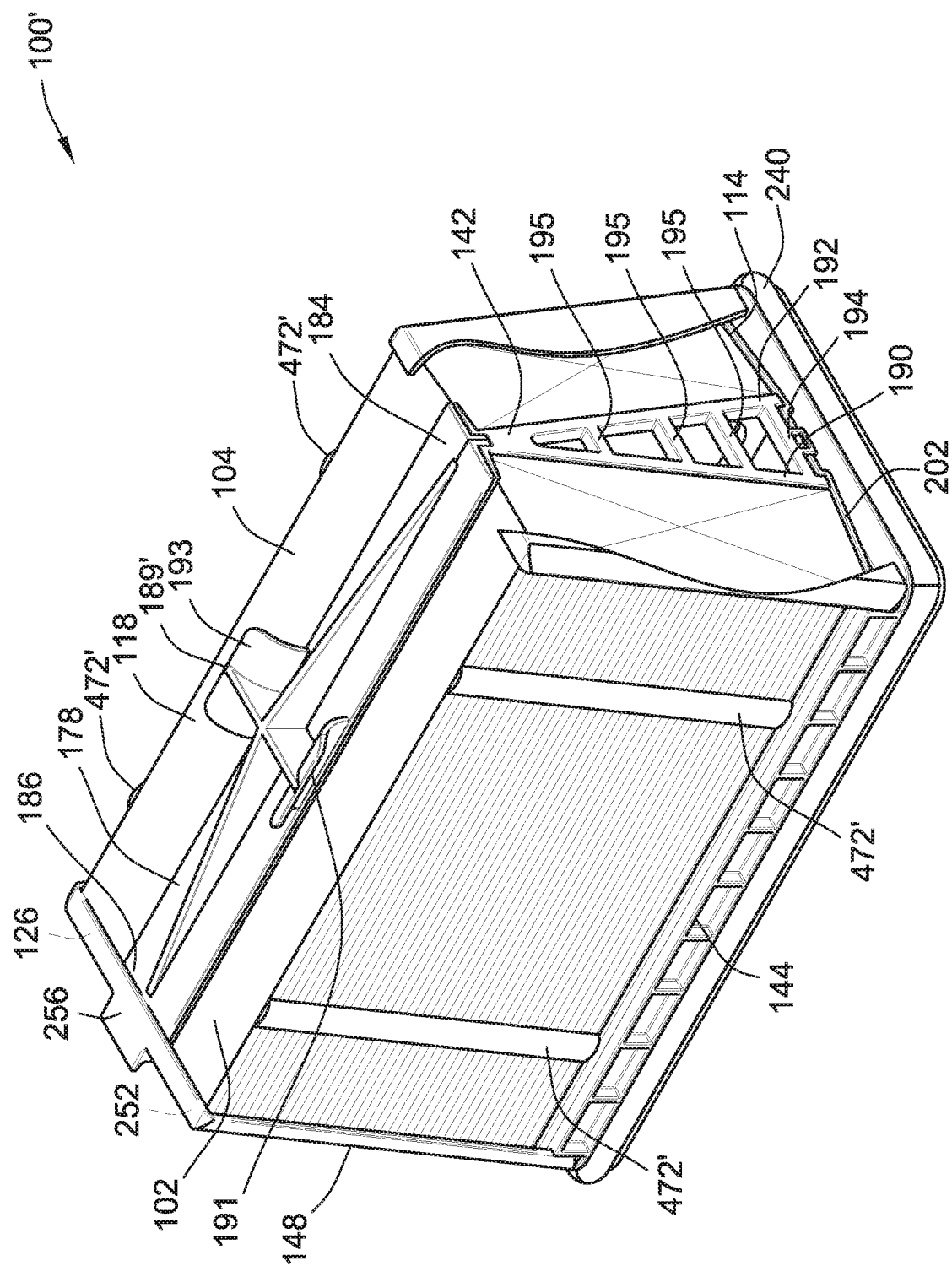
FIG. 14 is a partial perspective illustration of an alternative embodiment of a filter element according to the invention.

FIG. 14 is a partial perspective illustration of a further embodiment of a filter element 100'. This embodiment is similar to and can include substantially all of the features of the prior embodiments. The filter element 100' has an alternative handle 189' having first and second curved portions 191, 193. The filter element 100' has pleat stabilizers 472' extending the entire length of the filter media panels 102,104. In addition, the filter element 100' has intermediate cross-braces 195 that extend between the converging elongated segments 190, 192 that provide additional structural support to the support frame 142. It will be readily understood that the handle 189', pleat stabilizers 472' and cross-braces 195 can be used individually or in combination with any of the embodiments disclosed herein.

Figure 15:
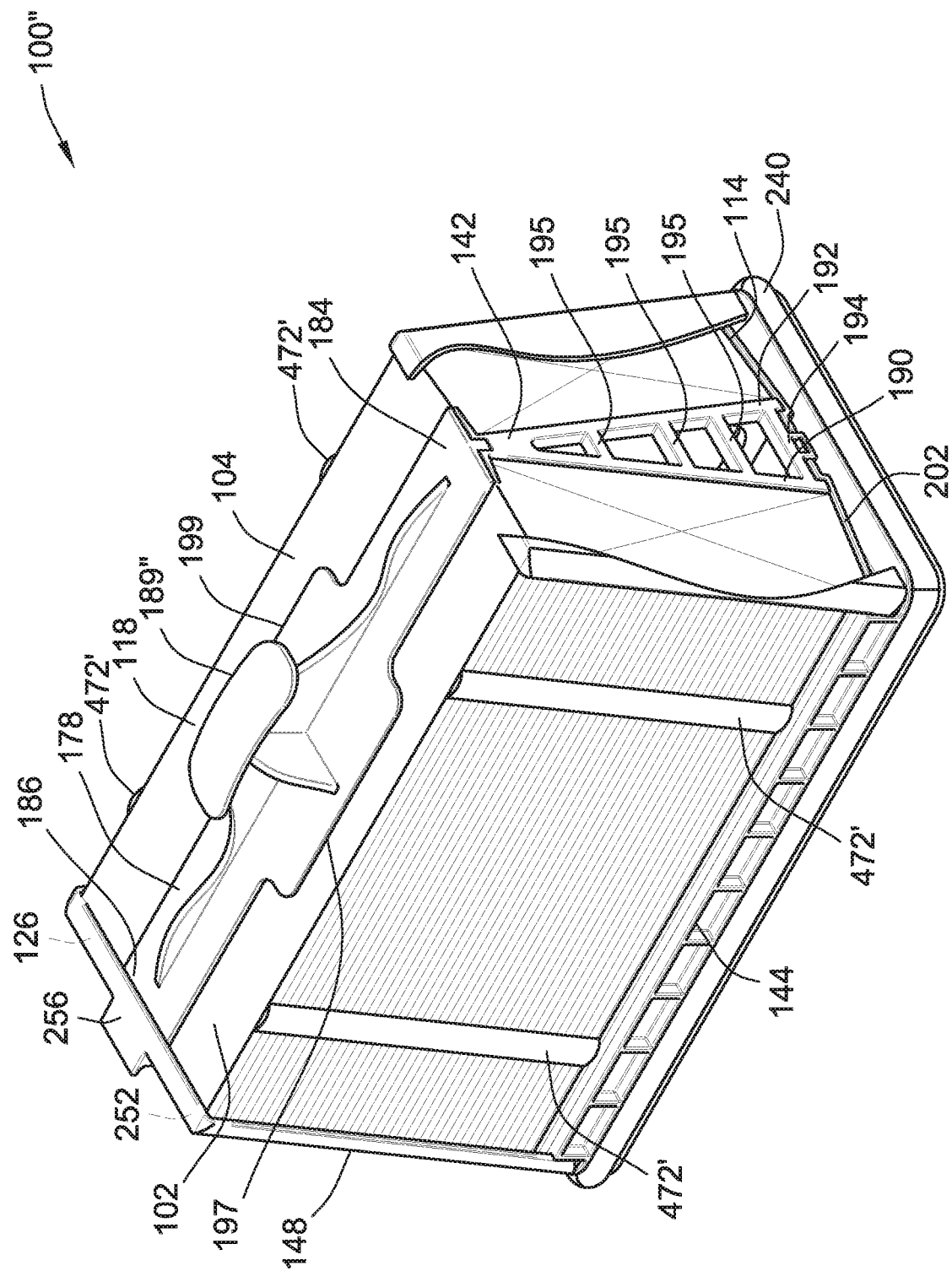
FIG. 15 is a partial perspective illustration of an alternative embodiment of a filter element according to the invention.

FIG. 15 is a partial perspective illustration of a further embodiment of a filter element 100". This embodiment is similar to and can include substantially all of the features of the prior embodiments. The filter element 100" has an alternative handle 189" having first and second handle base flanges 197, 199. The filter element 100" has pleat stabilizers 472' extending the entire length of the filter media panels 102,104. In addition, the filter element 100" has intermediate cross-braces 195 that extend between the converging elongated segments 190, 192 that provide additional structural support to the support frame 142. It will be readily understood that the handle 189", the first and second handle base flanges 197, 199, pleat stabilizers 472' and cross-braces 195 can be used individually or in combination with any of the embodiments disclosed herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   first and second filter media panels, each filter media panel defining a first, a second, a third and a fourth side, for each filter media panel, the first and second sides are offset from one another and extend between the third and fourth sides which are offset from one another;
   a support frame maintaining the first and second filter media panels in a generally spaced orientation forming a cavity therebetween;
   a base frame defining a first opening in fluid communication with the cavity;
   first and second end cap structures, the first end cap structure operably sealing the third side of the first and second filter media panels and the second end cap structure operably sealing the fourth side of the first and second filter media panels, the base frame having a first portion captured in the first end cap structure and a second portion captured in the second end cap structure; and
   the first portion of the base frame is first outward extending flange that is received inside the first end cap structure and the second portion of the base frame is a second outward extending flange that is received inside the second end cap structure, the first and second flanges being on opposite sides of the first opening and extending outward away from one another.

2. The filter element of claim 1, wherein the support frame defines first, second, third, and fourth sides, the first and second sides are offset from one another and extend between the third and fourth sides, the first side of the support frame being positioned adjacent the first sides of the first and second filter media panels; the second side of the support frame being positioned adjacent the second sides of the first and second filter media panels; the third side of the support frame being positioned adjacent the third sides of the first and second filter media panels; the fourth side of the support frame being positioned adjacent the fourth sides of the first and second filter media panels.

3. The filter element of claim 2, wherein the third side of the support frame is captured in the first end cap structure and the fourth side of the support frame is captured in the second end cap structure.

4. The filter element of claim 2, further comprising a second side support structure adjacent the second sides of the first and second media panels and the support frame, the second side support structure extending between first and second ends, the first end being captured in the first end cap structure and the second end being captured in the second end cap structure.

5. The filter element of claim 4, wherein the first and second filter media panels are pleated media panels, wherein at least one pleat of the first and second filter media panels is pinched between the second side of the support frame and the second side support structure.

6. The filter element of claim 2, wherein the second side of the support frame overlaps, at least in part, the second sides of the first and second filter media panels.

7. The filter element of claim 2, wherein the first side of the support frame defines a second opening in fluid communication with the cavity between the first and second filter media panels.

8. The filter element of claim 7, wherein the first, second, third, and fourth sides of the support frame bound first and second flow openings, the first flow opening being adjacent the first filter media panel and the second flow opening being adjacent the second filter media panel.

9. The filter element of claim 8, wherein the first and second filter media panels are pleated media panels formed from a sheet of filter media having a plurality of panels formed by alternating folds, the folds extending longitudinally between the third and fourth sides of the filter media panels, the first side of the filter media panels being adjacent the base frame and the second side of the filter media panel being spaced apart from the first side and the base frame, the third and fourth sides of the filter media panels extending between the first and second sides.

10. The filter element of claim 1, further comprising a housing seal carried by the base frame for operably sealing the filter element to a housing structure.

11. The filter element of claim 1, wherein the first and second end cap structures are formed from rigid urethane, the rigid urethane capturing the corresponding side of the support frame, portion of the base frame and sealing the corresponding sides of the first and second filter media panel.

12. The filter element of claim 1, wherein the first sides of the first and second filter media panels are sealingly attached to the base frame.

13. The filter element of claim 1, wherein the first and second filter media panels define interior faces, the interior faces of the first and second filter media panels generally facing each other.

14. The filter element of claim 13, wherein the support frame and base frame maintains the interior faces of the first and second filter media panels in a non-parallel orientation with the first sides of the first and second panels spaced apart from one another at a greater distance than the second sides of the first and second panels such that the cavity is generally wedge shaped.

15. The filter element of claim 14, wherein each of the first and second portions of the base frame defines first and second tapered locating surfaces, the first side of the first filter media panel supported on the first tapered locating surfaces and the first side of the second filter media panel supported on the second tapered locating surfaces.

16. The filter element of claim 15, wherein the first tapered locating surfaces are substantially parallel to the first side of the first filter media panel and the second tapered locating surfaces are substantially parallel to the first side of the second filter media panel.

17. The filter element of claim 15, wherein the first tapered locating surfaces are substantially perpendicular to the interior face of the first filter media panel and the second tapered locating surfaces are substantially perpendicular to the interior face of the second filter media panel.

18. A filter element comprising:
   first and second filter media panels, each filter media panel defining a first, a second, a third and a fourth side, for each filter media panel, the first and second sides are offset from one another and extended between the third and fourth sides which are offset from one another;
a support frame maintaining the first and second filter media panels in a generally spaced orientation forming a cavity therebetween;
a base frame defining a first opening in fluid communication with the cavity; first and second end cap structures, the first end cap structure operably sealing the third side of the first and second filter media panels and the second end cap structure operably sealing the fourth side of the first and second filter media panels, the base frame having a first portion captured in the first end cap structure and a second portion captured in the second end cap structure, and
wherein the first and second end cap structures are each composite structures including a cupped end cap and adhesive within the cupped end cap, at least the adhesive capturing the corresponding side of the support frame, portion of the base frame and sealing the corresponding sides of the first and second filter media panel.

19. A filter element comprising:
first and second filter media panels, each filter media panel defining first, second, third and fourth sides, for each filter media panel, the first and second sides are offset from one another and extend between the third and fourth sides, the first and second filter media panels define interior faces, the interior faces of the first and second filter media panels generally facing each other;
a support frame maintaining the first and second filter media panels in a generally spaced orientation forming a cavity therebetween;
a base frame defining a first opening in fluid communication with the cavity, the support frame and base frame maintaining the interior faces of the first and second filter media panels in a non-parallel orientation with the first sides of the first and second panels spaced part from one another at a greater distance than the second sides of the first and second panels such that the cavity is generally wedge shaped;
wherein the base frame defines first and second tapered locating surfaces, the first side of the first filter media panel supported on the first tapered locating surfaces and the first side of the second filter media panel supported on the second tapered locating surfaces;
a first end cap capturing therein the third side of the first and second filter media panels, the first tapered locating surface, and a first end of the support frame,
a second end cap capturing therein the fourth side of the first and second filter media panels, the tapered locating surface, and a second end of the support frame, opposite the first end.

20. The filter element of claim 19, wherein the first and second tapered locating surfaces are non-perpendicular and non-parallel to one another.

21. The filter element of claim 19, wherein the first and second tapered locating surfaces are non-perpendicular and non-parallel to a bisecting plane extending between the first and second filter media panels, the first and second tapered locating surfaces extending at a first angle relative to the bisecting plane, the interior faces of the first and second filter media panels extending at a second angle relative to the bisecting plane, the first and second angles being substantially complimentary.

22. The filter element of claim 19, wherein the first tapered locating surfaces are substantially parallel to the first side of the first filter media panel and the second tapered locating surfaces are substantially parallel to the first side of the second filter media panel.

23. The filter element of claim 19, wherein the first tapered locating surfaces are substantially perpendicular to the interior face of the first filter media panel and the second tapered locating surfaces are substantially perpendicular to the interior face of the second filter media panel.

24. A filter element comprising:
first and second filter media panels, each filter media panel defining first, second, third and fourth sides, for each filter media panel, the first and second sides are offset from one another and extend between the third and fourth sides, the first and second filter media panels define interior faces, the interior faces of the first and second filter media panels generally facing each other;
a support frame maintaining the first and second filter media panels in a generally spaced orientation forming a cavity therebetween;
a base frame defining a first opening in fluid communication with the cavity, the support frame and base frame maintaining the interior faces of the first and second filter media panels in a non-parallel orientation with the first sides of the first and second panels being spaced part from one another at a greater distance than the second sides of the first and second panels such that the cavity is generally wedge shaped; and
the support frame being directly mechanically snap attached to the base frame.

25. The filter element of claim 24, further comprising a handle member, the handle member being attached to the support frame, proximate the second sides of the filter media panels.

26. The filter element of claim 25, further comprising first and second end cap structures, the base frame having a first portion captured in the first end cap structure and a second portion captured in the second end cap structure.

27. The filter element of claim 26, wherein:
the first end cap structure operably seals the third side of the first and second filter media panels and the second end cap structure operably seals the fourth side of the first and second filter media panels,
the support frame has first, second, third and fourth sides, the third and fourth sides being spaced apart and extending between the first and second sides, the third side of the support frame being captured by the first end cap structure and the fourth side of the support frame being captured by the second end cap structure.

28. The filter element of claim 27, wherein a first end of the handle member is captured by the first end cap structure and a second opposed end of the handle member is captured by the second end cap structure.

29. A frame for holding first and second filter media panels, the frame comprising:
a base frame defining a first opening therethrough;
a support frame mechanically, snap attached to the base frame and extending outward therefrom, the base frame and support frame configured to maintain the first and second filter media panels in a generally spaced orientation forming a cavity therebetween when mounted to the support frame and base frame;
the support frame maintaining the interior faces of the first and second filter media panels in a non-parallel orientation with the first sides of the first and second panels being spaced part from one another at a greater distance than the second sides of the first and second panels such that the cavity is generally wedge shaped.

30. The frame of claim 29, wherein the support frame has first, second, third and fourth sides, the first side defines a second opening in fluid communication with the first opening in the base frame, the third and fourth sides have converging edges that converge proximate the second side.

31. The frame of claim 30, wherein:
the third side of the support frame is formed by a pair of third side elongated segments that converge at the second side and a third side cross brace that extends between the pair of third side elongated segments, the third side cross brace being closer to the first side of the support frame than the second side of the support frame;
the fourth side of the support frame is formed by a pair of fourth side elongated segments that converge at the second side and a fourth side cross brace that extends between the pair of first side elongated segments, the fourth side cross brace being closer to the first side of the support frame than the second side of the support frame.

32. A filter element comprising:
first and second filter media panels, each filter media panel defining first, second, third and fourth sides, for each filter media panel, the first and second sides are offset from one another and extend between the third and fourth sides, the first and second filter media panels define interior faces, the interior faces of the first and second filter media panels generally facing each other;
a support frame maintaining the first and second filter media panels in a generally spaced orientation forming a cavity therebetween, the support frame being located between first and second filter media panels;
a base frame defining a first opening in fluid communication with the cavity and located proximate the first sides of the first and second filter media panels; and
first and second support screens, each screen being substantially L-shaped having a first side portion and an interior face portion, the first side portion of the first support screen being adjacent the first side of the first filter media panel and the interior face portion being adjacent the interior face of the first filter media, the first side portion of the second support screen being adjacent the first side of the second filter media panel and the interior face portion of the second support screen being adjacent the interior face of the second filter media.

33. The filter element of claim 32, wherein:
the interior face portion of the first support screen is positioned between the support frame and the interior face of the first filter media panel and the first side portion of the first support screen is positioned between the base frame and the first side of the first filter media panel,
the interior face portion of the second support screen is positioned between the support frame and the interior face of the second filter media panel and the first side portion of the second support screen is positioned between the base frame and the first side of the second filter media panel.

34. The filter element of claim 33, wherein each of the first and second support screens is formed from separate first and second pieces of screen with the first side portion being formed from the first piece of screen and the interior face portion being formed from the second piece of screen.

35. A filter element comprising:
first and second filter media panels, each filter media panel defining a first, a second, a third and a fourth side, for each filter media panel, the first and second sides are offset from one another and extend between the third and fourth sides which are offset from one another;
first and second frame members maintaining the first and second filter media panels in a non-parallel orientation forming a cavity therebetween with the second sides adjacent one another and the first sides spaced apart from one another;
the first frame member including a first portion that extends over at least a portion of the second side of the first filter media panel and a second portion that extends over at least a portion of the second side of the second filter media panel;
the second frame member including a first portion that extends over the first side of the first filter media panel and a second portion that extends over the first side of the second filter media panel;
a first end cap structure attached to the third side of the first filter media panel and the third side of the second filter media panel, the first end cap structure capturing portions of the first and second frame members therein;
a second end cap structure attached to the fourth side of the first filter media panel and the fourth side of the second filter media panel, the second end cap structure capturing portions of the first and second frame members therein,
wherein the portions of the first frame member that are captured in the first and second end caps are located between the first and second end caps; and
wherein the portions of the second frame member that are captured in the first and second end caps are located between the first and second end caps.

36. The filter element of claim 35, wherein:
the first end cap structure includes an adhesive material that captures the third side of the first filter media panel and the third side of the second filter media panel;
the second end cap structure includes an adhesive material that captures the fourth side of the first filter media panel and the third side of the second filter media panel.

37. The filter element of claim 36, wherein:
the adhesive material of the first end cap structure captures a portion of the first frame member and a portion of the second frame member; and
the adhesive material of the second end cap structure captures a portion of the first frame member and a portion of the second frame member.

38. The filter element of claim 36, wherein:
the first end cap structure includes a first cupped end cap secured to the first and second filter media panels and the first and second frame members by the adhesive material of the first end cap structure;
the second end cap structure includes a second cupped end cap secured to the first and second filter media panels and the first and second frame members by the adhesive material of the second end cap structure.

39. The filter element of claim 35, wherein the first portion of the first frame member covers less than the entirety of the second side of the first filter media panel and the second portion of the first frame member covers less than the entirety of the second side of the second filter media panel.

40. The filter element of claim 39, wherein the second frame member includes:
a first plurality of tapered surfaces positioned adjacent to the first side of the first filter media panel; and
a second plurality of tapered surfaces positioned adjacent to the first side of the second filter media panel.

41. The filter element of claim 40, wherein the first plurality of tapered surfaces form an angle with the second plurality of tapered surfaces that is less than one hundred eighty degrees.

42. The filter element of claim 41, wherein the first portion of the first frame member has a first tapered bottom surface and the second portion of the first frame member has a second tapered bottom surface, the first and second tapered bottom surfaces extend at an angle relative to one another that is greater than one hundred eighty degrees.

43. The filter element of claim 42, wherein:
- the first tapered bottom surface of the first portion of the first frame member is parallel to the first plurality of tapered surfaces of the second frame member; and
- the second tapered bottom surface of the second portion of the first frame member is parallel to second plurality of tapered surfaces of the second frame member.

44. The filter element of claim 35, wherein the first and second frame members directly engage one another.

45. The filter element of claim 35, wherein the first and second media panels, first and second end cap structures and first and second frame members are permanently secured together by the first and second end cap structures.

* * * * *

UNITED STATES PATENT AND TRADEMARK OFFICE
CERTIFICATE OF CORRECTION

PATENT NO. : 10,870,074 B2
APPLICATION NO. : 15/211527
DATED : December 22, 2020
INVENTOR(S) : Benny Mathew Varghese et al.

Page 1 of 1

It is certified that error appears in the above-identified patent and that said Letters Patent is hereby corrected as shown below:

In the Claims

Column 13, Claim 1, Line 36 currently reads "the first portion of the base frame is first outward" and should correctly read -- the first portion of the base frame is a first outward --

Column 15, Claim 18, Line 2 currently reads "offset from one another and extended between the third" and should correctly read -- offset from one another and extend between the third --

Signed and Sealed this
Second Day of March, 2021

Drew Hirshfeld
*Performing the Functions and Duties of the
Under Secretary of Commerce for Intellectual Property and
Director of the United States Patent and Trademark Office*